2 Sheets--Sheet 1.
H. J. KENT.
Potato-Planters.
No. 154,180. Patented Aug. 18, 1874.
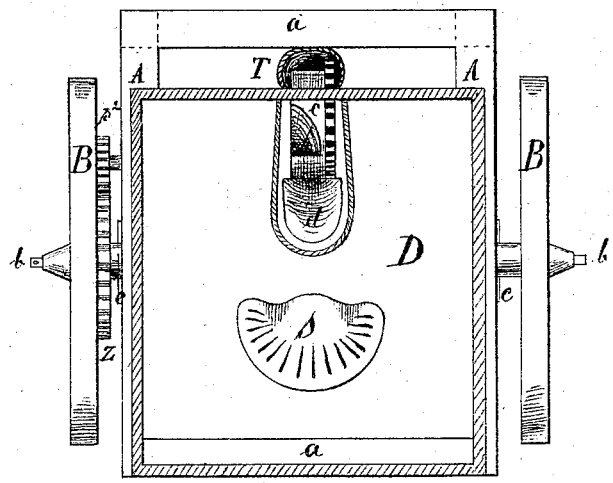
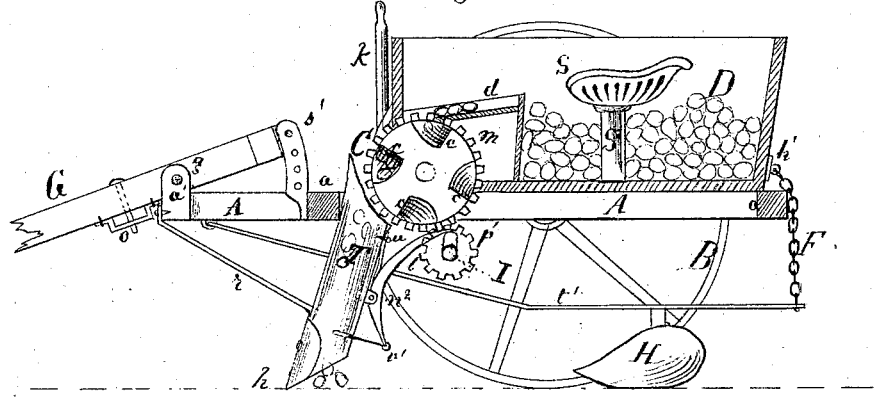
Witnesses
A. C. Parsons
B. F. Parsons
Inventor
Hiram J Kent
By Peck & Parsons his attys 2 Sheets--Sheet 2.

H. J. KENT.
Potato-Planters.

No.154,180. Patented Aug. 18, 1874.

Witnesses
A C Parsons
B F Parsons

Inventor
Hiram J. Kent
By Peck & Parsons his Attys

UNITED STATES PATENT OFFICE.

HIRAM J. KENT, OF PALMYRA, NEW YORK.

IMPROVEMENT IN POTATO-PLANTERS.

Specification forming part of Letters Patent No. 154,180, dated August 18, 1874; application filed October 29, 1872.

*To all whom it may concern:*

Be it known that I, HIRAM J. KENT, of Palmyra, in the county of Wayne and State of New York, have invented certain new and useful Improvements in Potato-Planters; and I do hereby declare the following to be a full and exact description thereof, sufficient to enable those skilled in the art to which it appertains to construct and use the same, reference being had to the drawings and to the letters and figures of reference marked thereon accompanying this specification, like letters and figures representing like parts throughout the specification.

Figure 3:
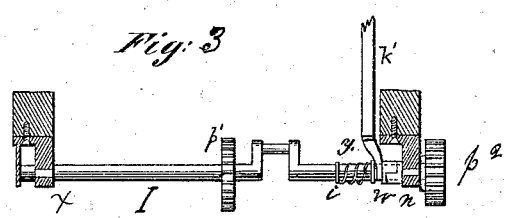
Figure 4:
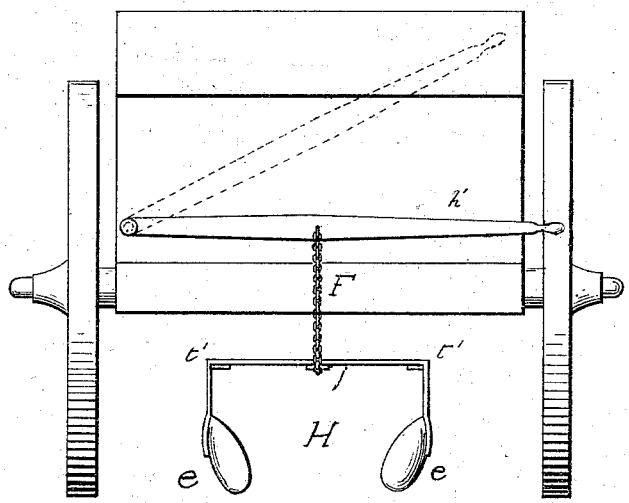

Figure 1 represents a longitudinal vertical section of my improvement. Fig. 2 is a top view of the same mounted on traction-wheels. Fig. 3 represents the shaft and apparatus for throwing the feeding and depositing mechanism out of gear, and other devices for operating the machine. Fig. 4 shows the rear end of the planter and the device for operating the coverer.

The object of my improvement is, by mechanical devices, to obtain a machine for planting potatoes by placing the seed in a hopper and conveying it to the drill, depositing it at regular intervals, and covering the same with earth automatically. It consists in the construction and arrangement of the mechanism by which this object is attained, as herein described.

A A represent the side, and $a\ a$ the end, bars of a wood frame in rectangular form. This frame is balanced on the axle-journals $b\ b$ of the traction-wheels B B. The journals are secured to the side bars A A by means of the plates $c\ c$, Fig. 2. Upon this frame A A and $a\ a$, and between the traction-wheels B B, is mounted a box, D, within which is contained the seed to be planted, the hopper $d$ to receive the same, the boy's seat $s$, and a part of the cup-wheel C, which receives the seed and conveys it to the tube T. At the front end of the box D is the hopper $d$, into which the seed is cast by hand, and from which it passes, by the revolving of the cup-wheel C, into cups $c\ c\ c$ on the side of the wheel. C represents the cup-wheel, which revolves under the mouth of the hopper $d$ and over the mouth of the tube T. In its revolutions it receives the seed from the hopper into cups or recesses on the side of the wheel and delivers it into the tube T. It is made of wood, and the cups are recessed into its periphery. On the side, at its circumference, there is bolted a metal cogged rim, $m$, which gears into the pinion $p^1$ hung to the shaft I, and as the shaft is put in motion by the movement of the driving-wheels B B, the pinion $p^1$ revolves and puts the cup-wheel in operation. T is the tube which receives the seed from the cup-wheel and guides it to the ground. It is enlarged at the top for the purpose of receiving the seed, firmly secured to the frame A, and further supported by the brace $r$ attached to the cross-bar $a$. $v'$ is a valve which regulates the intervals of the deposits of the seed in passing from the tube to the ground. It is operated by a pivoted lever, $l$, to which it is attached. The lever extends to a crank or tappet, $t$, on the shaft I. As the shaft revolves it brings the crank in contact with the upper end of the lever, which operates the valve and closes the opening. $u$ is a spring attached to the back side of the tube T, and presses against the lever $l$. Its function is to close the valve by pressing against the back of the lever after it is opened by contact with the crank or tappet $t$. $h$ is a shovel secured to the lower end of the tube T, which, as the machine moves forward, opens a drill for the reception of the seed. One end of the shaft I passes loosely through a bearing, $x$, Fig. 3, attached to one of the side bars A, while the other end fits in a tubular clutch forming part of the pinion $p^2$, which rotates freely within a bearing, $n$, fastened to the side of the frame A, as will be seen at Fig. 3. The pinion $p^2$ gears with a large wheel, Z, Fig. 2, which is secured to one of the driving-wheels, and gives motion to the shaft I, which revolves the cup-wheel. The tongue G, to which the moving power is attached, is connected to the frame A and pivoted on the bolt that passes through the keep $a'$, at $g$, and the depth of the drill is regulated by moving the rear end up or down in the guide $s'$. O is a strap to which a double-tree may be attached. H is a coverer of the seed, in its construction resembling two plowshares facing inwardly, which throws the earth upon the seed and covers it to the desired depth. It is suspended from the frame A by means of rods at $t'\ t'$, Fig.

4, and $t'$, Fig. 1, attached to the frame, and by the chain F is connected to the rear end of the box D. $j$ is a cross-bar connecting the rods $t'$ $t'$, to which is attached the coverer H. The chain F, to one end of which the coverer is attached, has its other end affixed to a lever, $h'$, by means of which the operator is enabled to regulate the quantity of earth thrown upon the seed. The driving mechanism is thrown out of gear by means of a vertical rod, $k$, operating a horizontal lever, $k'$, at the bottom, one end of which is attached to the cross-bar of the frame, and the other end is turned edgewise, and fits into a collar, $w$, on the shaft I, as shown in Fig. 3, and is operated by the driver, thus moving the shaft out of engagement with the clutch, in which position it is held by a spring. $y$ is a spiral spring on the shaft I, between the collar $i$ and the bearing $w$, which, as soon as the rod $k$ is released, throws the shaft back into engagement with the clutch. The clutch having a stop that engages itself with the collar in all forward movements, all backward movements disengage the clutch and throw the driving mechanism out of gear.

When turning or driving over the road the planting mechanism is thrown out of gear, as above described.

What I claim, and desire to secure by Letters Patent, is—

The potato-planter, consisting of the traction-wheels B B, frame A $a$, box D, hopper $d$, cup-wheel C, tube T, adjustable tongue G, and coverer H, all constructed and combined substantially as and for the purposes herein described and specified.

In testimony whereof I have hereunto set my hand this 25th day of October, 1872.

HIRAM J. KENT.

Witnesses:
   B. F. PARSONS,
   H. N. ALLEN.